Feb. 21, 1939.　　　T. H. KRUEGER　　　2,148,026
TAPE SERVING MACHINE
Filed Dec. 1, 1934　　　3 Sheets-Sheet 2

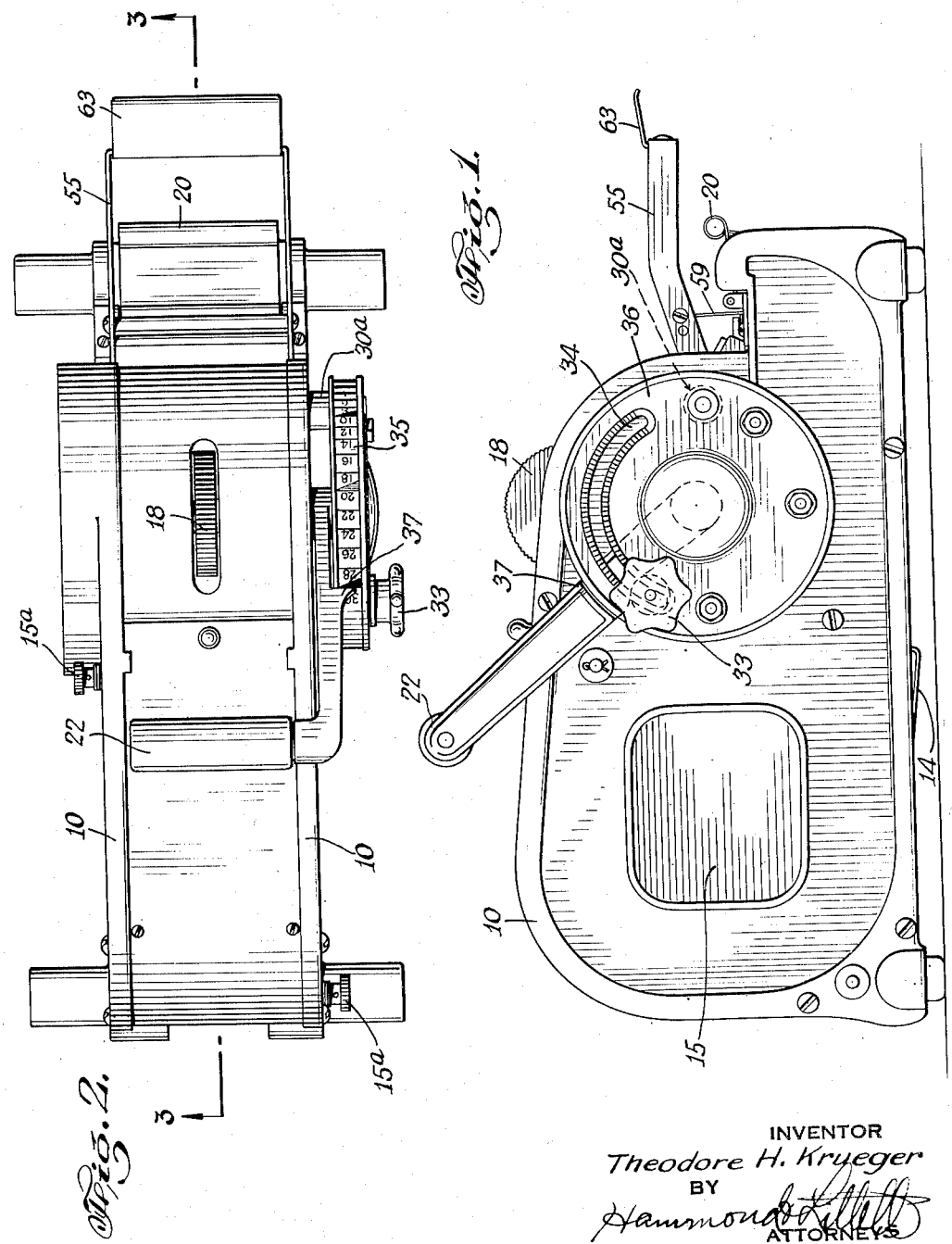

INVENTOR
Theodore H. Krueger
BY
ATTORNEYS

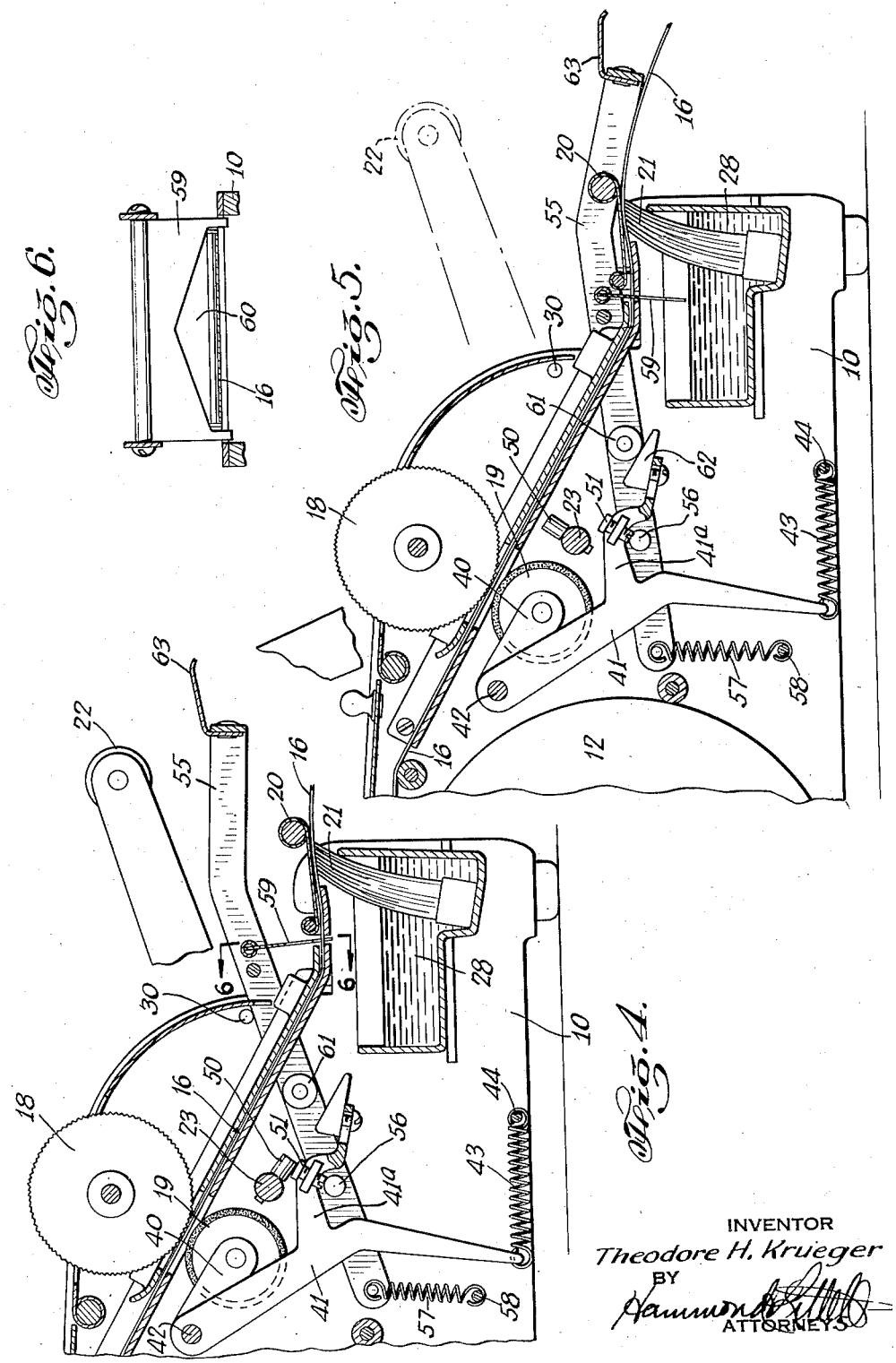

Patented Feb. 21, 1939

2,148,026

UNITED STATES PATENT OFFICE 2,148,026

TAPE SERVING MACHINE

Theodore H. Krueger, Stratford, Conn.

Application December 1, 1934, Serial No. 755,554

21 Claims. (Cl. 91—14.5)

This invention relates to improvements in gummed tape feeding machines adapted for high speed delivery of moistened gummed tape and more particularly it relates to an improved feeding mechanism for the more accurate control of feed of measured lengths of tape.

My present invention is especially advantageous when applied to manually operated, gear drive, rotary type feeding mechanisms for feeding accurate lengths of gummed tape for in such machines the stroke of the operator varies to such an extent that it is almost impossible to correctly calibrate a scale which will uniformly measure the tape to be fed. This is especially true in the use of machines having a scale running from a maximum to a minimum and the measurement is of the non-feed movement of the operating arm.

In my prior Patent No. 1,962,720 issued June 12, 1934, I have disclosed a manually operated high speed gummed tape dispensing machine in which the feed rollers were normally in contact with the tape and they were gear driven from the operating arm. In such machine, measurement of the tape was effected by control of the operating arm but certain friction was impressed on the feeding mechanism to reduce overrun to a minimum and other changes had to be made to reduce the operating power required to operate the machine.

The principal object of my present invention is to provide a gummed tape feeding machine of the high speed rotary feed type with free running feed elements which are automatically controlled to interrupt the feed and are held out of feeding contact during a predetermined time so that overrunning of the tape may be avoided without the necessity of use of brakes or other frictional mechanisms to control the inertia of the parts.

It is another object of my present invention to provide an improved feeding mechanism for a gummed tape machine of the normally in contact rotary feed type in which the frictional feeding relation is interrupted by moving the feed rollers out of tape contact at the end of the feed stroke so that the amount of tape fed may be accurately controlled and so that the tape movement will be stopped before the severing operation is begun.

Another object of my invention is to provide an improved tape feeding mechanism for a high speed rotary type gummed tape dispensing machine in which the feeding relation which is interrupted at the end of the feed stroke is maintained out of tape contact during the severing stroke to prevent buckling of the tape.

Another and more specific object of the invention is to provide in a manually operated, normally in contact tape feeding mechanism, an interrelated control between the feed arm and the feed rollers to interrupt the feed at the end of movement of the feed arm so that the tape must stop moving forward before the severing operation commences thereby preventing blocking or buckling of the tape behind the knife.

Another object of the invention is to provide a new method of feeding gummed tape in accurately measured lengths by automatically removing the feeding mechanism from the tape when a predetermined length of tape is reached, maintaining the separation during severing, and automatically reinstating the feeding relation for instantaneous availability on the next movement of the feed arm.

Further objects and advantages of this invention will appear from the following description thereof taken in connection with the attached drawings which illustrate a preferred form of embodiment of my invention and in which Fig. 1 is a side elevation of a hand operated gummed tape serving device.

Fig. 2 is a top plan view of the device shown in Fig. 1.

Fig. 4 is a partial vertical section similar to Fig. 3, but showing the operating handle in advanced position.

Fig. 5 is a partial vertical section similar to Figs. 3 and 4 and showing the cutting device in advanced position.

Fig. 6 is a vertical section taken substantially along the lines of 5—5 of Fig. 4 and showing the cutting knife.

Figure 3:
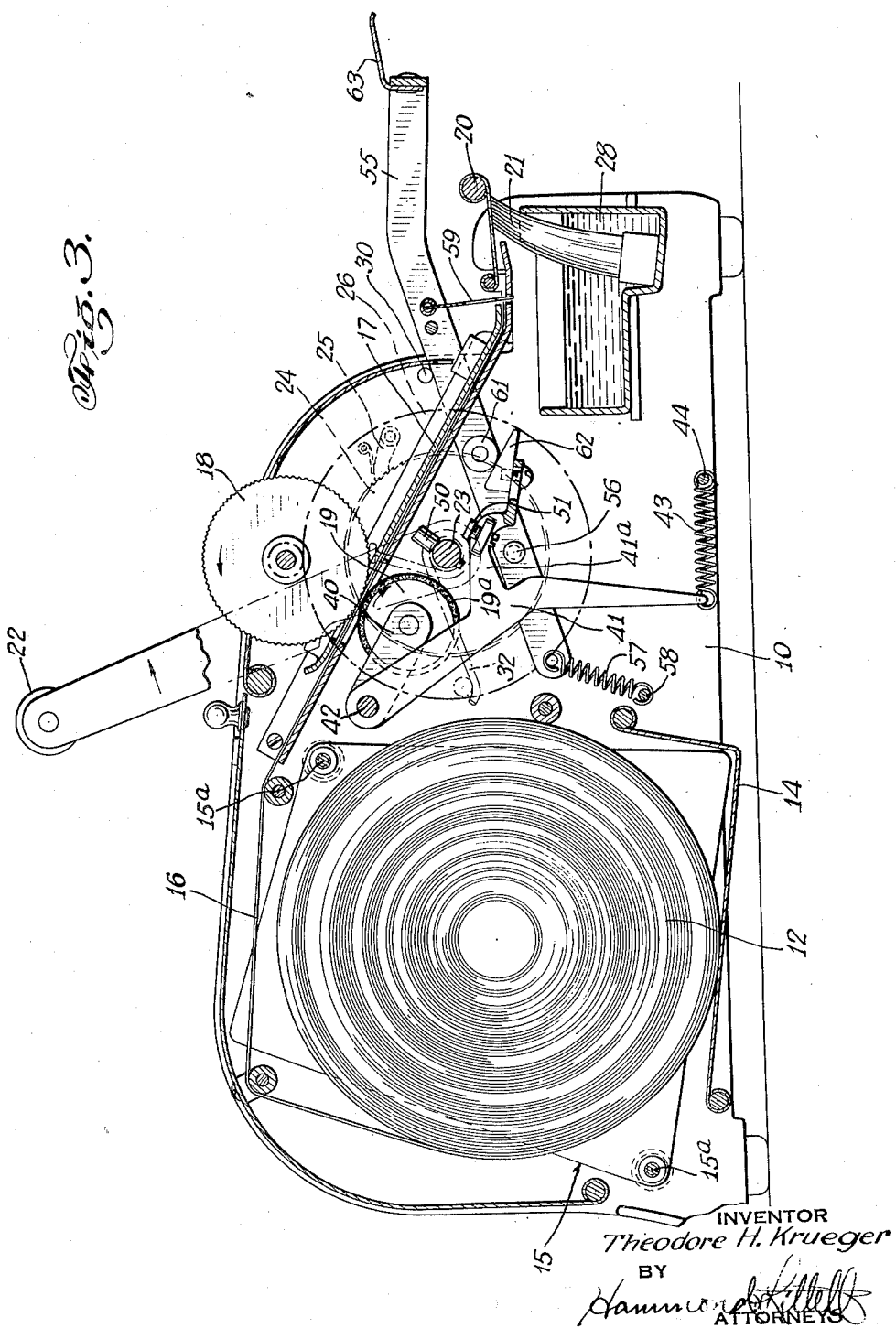
Fig. 3 is a vertical section taken substantially along the lines of 3—3 of Fig. 2, showing the internal construction of the feeding mechanism.

The specific form of embodiment to which my invention may be successfully applied and which is shown in the attached drawings is normally provided with a pair of side frames 10 which carry a roll of gummed tape 12, such roll being usually supported on a tape supporting pan 14 and carried between adjustable width guides 15. These guides 15 and the pan 14 offer a certain resistance to rolling, whereby the tape 16 may be maintained under tension. The guides 15 may be adjusted for various width tape by the screws 15a.

As shown in detail in Fig. 3, a tape guide path 17 is provided through which the tape 16 is fed by the feeding couple which consists of an upper roller 18 and a lower roller 19. The rollers contact with the tape through a suitable slotted portion in the tape guide 17 and draw the tape from the roll 12 and force it out of the machine past the moistening couple including the pivoted pressure plate 20 and the moistening brush 21. The brush commonly rests in a receptacle 28 for water and after being moistened, the tape is ready for use as desired.

The accurate feed of definite measured lengths of tape depends on feeding the tape for a set distance and this is controlled in the manual machines by the manipulation of a tape feed operating arm such as 22 which is preferably keyed on the main shaft 23. A one way ratchet 24 is also keyed to the shaft 23 and by means of the pawl 25 and gear 26, the roller 18 is driven in one direction only to feed the tape. The measuring of the tape is controlled by the movement of the operating arm 22 which engages a fixed stop 30a at the extreme forward end of its stroke as shown in Fig. 1. The rear movement of the operating arm, which is brought about by the spring 32, is limited by an adjustable stop 33 which is adjustable in the slot 34 in the drum 36 on the side of the machine.

For convenience in measuring, the scale 35 as shown in Fig. 2 is applied to the drum 36 and the pointer 37 on the operating arm 22 cooperates with the scale 35 to indicate the amount of tape to be fed.

This scale 35 preferably reads from maximum to zero in the direction of feed and the pointer 37 at the return position of the operating arm 22 will read directly the amount of tape which will be dispensed on the feed movement of the operating arm. If, as shown in Fig. 2 for example, the adjustable stop 33 is arranged to permit the operating arm to return to the 30 mark, the forward movement of the operating handle if brought forward to the zero position will dispense thirty inches of tape.

The gearing of the feed roller 18 and the inertia of the parts normally prevent accurate tape feeding except under very slow operating conditions.

With substantially frictionless parts, the heavy weight of the ratchet mechanism usually causes a considerable overrun in the feed rollers. This will be apparent when it is understood that different operators grasp the feed arm with materially different force and it would normally be impossible to set a scale in accordance with the feed. In one case, there would be overrun while in another there might be insufficient delivery, either of which are highly wasteful and objectionable.

As the principal object of these machines is to rapidly feed the necessary amount of tape, great difficulty has been found heretofore in precisely governing the amount of tape to correspond with a calibrated scale.

In my present invention, I absolutely prevent feeding of the tape beyond a predetermined point by interrupting the feeding relation, by removing the frictional feeding contact from the tape. The complementary or idler roller 19 is preferably faced with a soft rubber or other friction surface 19a and it is mounted on an off-set yoke 40 which is preferably integral with the lever 41, which in turn is pivoted on an axis 42. The lever 41, being engaged by the spring 43 which is also secured to the fixed stop 44, the roller 19 is normally held against the tape 16 and driving roller 18 to form a frictional contact and bring about the desired feed of the tape. The roller 18 is preferably of knurled surface to better cooperate with the tape and the resilient surface of the idler roller.

The idler roller 19, if withdrawn from contact with the tape 16 at the end of the desired feed stroke, as shown in Fig. 4, will prevent further tape delivery as the driven roller 18 alone can no longer feed the tape. This movement of the roller 19 is brought about by the contact of a knob 50 which rotates with the main shaft 23, to which the operating arm 22 is keyed. The knob 50 in turn contacts with an adjustable screw 51 carried on an extension 41a of the roller carrying lever 41. This contact depresses the lever 41 about the pivot 42 against the spring 43 so that the roller 19 moves into the full line position away from the tape as shown in Fig. 4.

It will therefore be apparent that as the operating arm reaches the end of the stroke which corresponds with the path of the indicator 37 along the scale 35, until the zero position is reached the operating arm will cause the feeding of tape. At the end of the stroke however, not only does the operating arm reach its extreme position but the feeding couple is broken and the tape movement must of a necessity stop, although the feed roller 18 may, due to its inertia, continue in motion. The friction on the tape 16 due to the position on the roll 12 in the pan 14 stops the tape movement after the feeding pull is stopped. Precisely determined lengths of tape can therefore be obtained and the scale 35 may be accurately calibrated for the feeding of the the machine. This is, of course, of considerable importance where an exact length of tape is desired.

Delivery of fixed lengths of tape also depends on severing the tape at the desired point. I have found that although the tape feed may be stopped while the operating arm is in the extreme forward feeding position, quick releasing of the arm would result in a recommencing of the feed of tape due to the residue inertia of the feeding roller and associated parts. If the rollers were again brought into immediate contact the re-feeding would seriously obstruct the operation of the severing device and cause buckling in the tape guide. This would also interfere with the correct amount of feding heretofore accomplished.

My improved severing control includes a blade carrying arm 55 which is pivoted at 56 to the frame of the machine and is normally held out of cutting position by means of the spring 57 secured to the fixed post 58 on the machine. This holds the arm against the stop 30. The knife blade 59 is suspended from the forward portion of the carrying arm 55 and as shown in Fig. 6 is of angular shape having a high central point forming an open throat 60. This permits free movement of the tape while the blade is out of position and it also facilitates severing when operated.

The tape severing arm 55 is also provided with a roller 61 which, as shown in Fig. 5, is adapted to cross the path of an adjustable stop 62, also carried on the extension 41a of the roller carrying lever 41. As the knife is depressed by engaging the finger piece 63, the roller 61 immediately comes into contact with the adjustable stop 62 to withhold the roller 19 from frictional contact with the feed roller 18. As soon as the tape is cut and the knife released, the tape idler roller will resume its initial tape contacting position.

The initial position of the parts is shown in Fig. 3 in which the roller 61 is shown as normally contacting with the stop 62 so that any movement of the knife by movement of the finger piece 63 will disturb the feeding relations. It will therefore be impossible for tape feeding to continue while the knife is being actuated. Buckling of the tape is absolutely prevented and the tape feeding cannot commence under any circumstances while the knife is being depressed. In the initial position, the tape feeding roller is also in feeding relation so that the first movement of the operating arm will immediately feed tape and the operating arm may therefore be an accurate indicator of the tape feed.

In the normal operation of the machine, the indicator 37 on the operating arm 22 is adjusted to the proper position on the scale for the amount of tape fed by the initial setting of the adjustable stop 33. As the operating handle is drawn forward the tape is immediately dispensed until the last part of the stroke separates the feed rollers and the feeding is stopped. Normally the path of the operator's hand is directly over the knife operating member 63, so that there is practically no opportunity for the roller 19 to again contact the tape and the roller 18 before the knife blade begins its actuation and continues to restrain further feeding. The result is that the amount of tape fed corresponds actually with the amount desired and no allowances have to be made for variations due to overrunning and inertia. The initial feed is positive and is immediately restored as soon as the knife is released.

Although my automatic control of the feed rollers is especially suitable for the manually operated machines, it is also possible to apply similar mechanism to the power operated machines. It is necessary to distinguish between such power operated machines however, for they have material differences in feeding relation. In my co-pending application, Serial No. 40,495, filed June 30, 1925, for example, I have shown a power operated machine in which the feeding rollers are normally out of tape feeding contact and the knife blade is normally in the tape path. My present invention is not applicable to such a construction for the problem of overrunning of tape does not exist, as the motor, being continuously operated, does not effect the stroke and measurement is effectuated only during the contact of the feed roller on the tape, such roller being normally not in such position.

In the type of machines having the feed rollers normally in contact, such rollers may be equally as well be operated by any other power source rather than the crank shown. In such machines, my invention may be well used to positively remove either or both the feed rollers from the tape for the necessary period, such rollers being automatically restored after such a period, such as the severing period that the inertia of the moving parts is entirely dissipated. As the feed rollers are again restored before the next feeding operation, there can be no space lag in the next feed and accurate lengths of tape can be fed whether the indicator is related to the movement of the initial drive source or the specific feed rollers.

It may also be convenient to mechanically link the feeding and severing control arms for a continuous separation of the feed rolls rather than depend on the close relation of the parts when operated by hand. My prior patent heretofore referred to also shows an electrically linked cutting lever which is manually controlled. Usually the cutting takes place immediately after the feed stroke and no interval will exist during which the feed rollers can re-engage the tape if the cutting lever also holds the feed rolls out of feeding relation. As the principal feature is to stop the feed for a short period at the end of the feed stroke, the feed rollers may be separated at the end of the feeding stroke or the beginning of the cutting stroke or both.

While I have shown a preferred form of embodiment of my invention, I am aware that other modifications may be made thereto and I therefore desire a broad interpretation of my invention within the scope and spirit of the description herein and of the claims appended hereinafter.

I claim:

1. In a gummed tape serving machine of the class described for serving gummed tape, in combination, a push feed feeding device, a severing device, a moistening couple including a relatively adjustable brush and presser plate, said feeding device including a rotary member normally frictionally engaging said tape, means to remove said rotary member for a sufficient period to stop the feed of tape, and means to automatically restore said feeding relation.

2. In a device for dispensing gummed tape, in combination, tape feeding means for feeding the tape, tape severing means, and a tape moistening couple beyond the severing means, said tape feeding means including a pair of tape engaging rollers, and means to rotate said rollers to feed tape, means to separate said rollers to stop the feed of tape, and means controlled by the severing means to hold the feed rolls out of feeding contact during operation of the severing means.

3. In a gummed tape serving machine, in combination, a tape roll holder, a severing device, a moistening device of the class described, and means to accurately measure and feed a predetermined length of tape which includes a plurality of separable feed rolls to feed the tape and an operating means to energize one of said feed rolls, said operating means including means operative to separate said feed rolls when the desired amount of tape has been fed to prevent further feeding due to inertia, and means to return the rolls to tape gripping relation after they have been separated and before the next feeding rotation of the feed rolls is begun.

4. In a gummed tape serving machine, in combination, a tape roll holder, a severing device, a moistening device of the class described, means to accurately measure and feed a predetermined length of tape which includes a plurality of separable feed rolls to feed the tape, and an operating means to energize said feeding and measuring means, said operating means separating said feed rolls to break the feeding relation when the desired amount of tape has been fed to prevent further feeding due to inertia, said severing device including an operating member, said severing device operating member separating said feed rolls and holding them separated during the severing operation.

5. In a gummed tape serving machine, in combination, a tape roll holder, a severing device, a moistening device of the class described, means to accurately measure and feed a predetermined length of tape which includes a plurality of separable rolls, one of said rolls being an idler and movable from the other roll, means to support said idler roll, and an operating means to energize said feeding and measuring means, said operating means separating said rolls to break the feeding relation when the desired amount of tape has been fed to prevent further feeding due to inertia, and said severing device including an operating member, said severing device operating member having means in contact with the idler tape feed roll support to separate said feed rolls and hold them separated during the severing relation.

6. In a strip serving apparatus of the class described, in combination, strip moistening means, strip severing means, means for holding a roll of gummed paper strip, a pair of feed rollers, means to normally contact the feed rolls with the strip when idle, means to rotate said rollers to synchronously feed the strip and means operative at the end of each feeding cycle to temporarily remove one of the rollers from the strip to break the feeding relation before the severing operation is effected whereby continued rotation of the rollers will not feed tape so that over-running of the tape is prevented.

7. In a strip serving machine of the type described, means to hold a supply of gummed strip, a pair of feed rolls, one at each side of the strip for feeding the strip out of the machine, means for normally holding the rolls together, manual means to separate the rolls to break the feeding relation and tape cutting means adjacent the feed rolls to cut the tape, said tape cutting means actuating the feed roll separating mechanism.

8. In a gummed tape serving machine in combination, means for feeding, cutting and moistening and severing gummed tape, the feeding means including driven means engaging the tape across a line transverse thereto to feed the tape out of the machine, means to bring the tape feeding means out of tape feeding position at will, a common actuating means for moving said tape feeding means out of tape contact and operating said tape severing means, and spring means to automatically restore the tape feeding relation after the tape severing means is operated.

9. In a gummed tape feeding moistening and severing mechanism adapted to accurately feed predetermined lengths of moistened gummed tape in combination, tape engaging means, tape severing means and means to operate said tape engaging means, said tape operating means and tape severing means having members cooperating with the tape engaging means to withdraw the tape engaging means from the tape to break the feeding relation at the end of each cycle whereby said tape engaging means feeds accurately measured lengths of tape, and said operating means including means to return the tape engaging means to engagement with the tape prior to the initiation of the next advancing operation of said engaging means.

10. A gummed tape dispensing machine having rotary tape feeding members, a tape moistening couple and a tape severing device, said tape feeding members including a driven roller and an idler roller, means to hold said rollers in tensioned contact on opposite sides of the tape to feed the tape, said holding means including a spring actuated lever having an offset yoke carrying the idler roller, said machine also having a manually operated member controlling the rotation of said rollers, and means operated by said manually operated member upon the completion of a feeding operation to engage, said roller carrying lever to remove said roller from frictional contact with the tape, said lever engaging means being releasable to cause the feeding relation to be restored automatically by the spring actuated lever before the rollers are again advanced.

11. A gummed tape dispensing machine having rotary tape feeding members, a tape moistening couple and a tape severing device, said tape feeding members including a driven roller and an idler roller, means to hold said rollers in tensioned contact on opposite sides of the tape to feed the tape, said holding means including a spring actuated lever having an offset yoke carrying the idler roller, said machine also having a manually operated member controlling the rotation of said rollers, means operated by said manually operated member, engaging said roller carrying lever to remove said roller from frictional contact with the tape, and means carried by the severing device to engage said roller carrying lever at the commencement of the severing stroke to withhold the frictional feeding contact during the severing operation.

12. In a gummed tape serving machine in combination, two rotary feed members normally gripping the tape between them when idle, a tape severing shear, a moistening couple, and means operative to stop the feed of the tape before the rotary feed members stop rotating and before the cutting operation is completed, including a device for momentarily separating the rotary feed members.

13. In a device for dispensing gummed tape, in combination, a tape feeding means for feeding the tape, tape severing means, and an adjustable tape moistening couple beyond the severing means, said tape feeding means including a pair of tape engaging rollers, means to rotate said rollers to feed tape, means on said feed roller actuating means to separate said rollers after a desired length of tape has been fed to stop the feed of the tape while the said rollers are rotating, and means to return the rollers to tape gripping relation after they have been separated and before the next feeding rotation of the feed rollers is begun.

14. In a gummed tape serving machine in combination, two rotary feed members normally gripping the tape between them when idle, means for actuating said feed members, a severing device, a moistening device, and means operative after the feeding of a strip of tape for separating the rotary feed members to stop the feed of the tape while said members are still rotating.

15. In a gummed tape serving machine in combination two rotary feed members normally gripping the tape between them when idle, a tape severing shear, a moistening couple, and means operative before said shear has severed the tape for stopping the feed of the tape, including a device for separating the rotary feed members, whereby their gripping of the tape is interrupted.

16. In a strip serving apparatus of the class described in combination strip moistening means and strip severing means, means for holding a roll of gummed paper strip, a pair of feed rollers, means to normally contact the feed rolls when idle with the strip, reciprocable means to rotate said rollers to synchronously feed the strip, and means operative at the end of each feeding cycle to temporarily remove one of the rollers from the strip to break the feeding relation before the severing operation is effected whereby continued rotation of the rollers will not feed tape so that over-running of the tape is prevented.

17. In a device for dispensing gummed tape, in combination, tape feeding means for feeding the tape, tape severing means, a tape moistening couple beyond the severing means, said tape feeding means including a pair of tape engaging rollers, and means to rotate said rollers to feed tape, means operative by an actuation of the severing means to hold the feed rollers out of feeding contact during the severing operation, and means to return the rollers to tape gripping relation after they have been separated and before the next feeding rotation of the feed rollers is begun.

18. In a gummed tape serving machine, in combination, two rotary feed members normally gripping the tape between them, a tape severing shear, and means operative to stop the feed of the tape before the rotary feed members stop rotating and before the cutting operation is completed, including a device for momentarily separating the rotary feed members, and means to return the rotary feed members to tape gripping relation after they have been separated and before the next feeding rotation of the rotary feed members is begun.

19. In a gummed tape serving machine, in combination, a pair of cooperating feed rollers, an operating handle therefor, means constituting a one-way driving connection from the handle to the feed rollers for causing the rollers to advance as the handle advances but to remain idle as the handle moves in the reverse direction, means for positively arresting the advance of the handle, and means for automatically separating the rollers to release the tape at the end of the advancing stroke to prevent further advance of the tape by the rollers after the handle has been arrested.

20. In a gummed tape serving machine, in combination, a pair of cooperating feed rollers, an operating handle therefor, means constituting a one-way driving connection from the handle to the feed rollers for causing the rollers to advance as the handle advances but to remain idle as the handle moves in the reverse direction, means for positively arresting the advance of the handle, means for automatically separating the rollers to release the tape at the end of the advancing stroke of the handle to prevent further advance of the tape by the rollers after the handle has been arrested, means to return the handle to its starting position, and means to restore the idle rollers automatically to tape gripping relation during or after the return of the handle has been initiated and before the next advance of the handle.

21. In a gummed tape serving machine, in combination, a pair of cooperating feed rollers, an operating handle therefor, means constituting a one-way driving connection from the handle to the feed rollers for causing the rollers to advance as the handle advances but to remain idle as the handle moves in the reverse direction, means for positively arresting the advance of the handle, means for automatically separating the rollers to release the tape at the end of the advancing stroke of the handle to prevent further advance of the tape by the rollers after the handle has been arrested, means to return the handle to its starting position, means to restore the idle rollers automatically to tape gripping relation after the return of the handle has been initiated, and an adjustable stop for limiting the return stroke of the handle.

THEODORE H. KRUEGER.